Patented June 9, 1936

2,043,688

UNITED STATES PATENT OFFICE 2,043,688

HYDROGENATION OF OXYGENATED ORGANIC COMPOUNDS

John C. Woodhouse, Cragmere, Del., assignor to E. I. du Pont de Nemours & Company, Wilmington, Del., a corporation of Delaware No Drawing. Application July 20, 1935, Serial No. 32,407

19 Claims. (Cl. 260—103)

The present invention relates to a process for the hydrogenation of the esters of oxygenated organic compounds and more particularly to the hydrogenation of the dicarboxylic acid esters of the oxygenated organic compounds obtained by the catalytic hydrogenation of carbon oxides under elevated temperatures and pressures. This application is a continuation in part of my copending application Ser. No. 676,671, filed December 18, 1934.

In the catalytic hydrogenation of the oxides of carbon, there are obtained, under certain conditions of operation, mixtures of oxygen-containing organic compounds of a higher order than methanol which products, usually of an oily consistency, comprise chiefly the saturated alcohols with four or more carbon atoms, together with saturated and unsaturated compounds such as the aldehydes, ketones, esters, and the like. In the U. S. patent of E. F. Izard, No. 1,993,552, filed Feb. 14, 1933, the dibasic acid esters of a mixture of these compounds are disclosed together with a method for their preparation. The method is effected essentially by reacting a lower alkyl ester of a polybasic organic carboxylic acid with the higher oxygenated organic compounds, obtained by the catalytic hydrogenation of carbon oxides under elevated temperatures and pressures, and in the presence of such catalysts as lead oxide. Esters of the above mixture of oxygenated organic compounds with the following polybasic acids are designated in that application: oxalic, malonic, succinic, phthalic, glutaric, adipic, pimelic, suberic, hexahydrophthalic, sebacic, carbonic, tricarballylic, aconitic, phosphoric, tartaric, etc. The mixture of oxygenated organic compounds usually of a somewhat oily consistency as prepared, is often colored and has an unpleasant odor. Consequently, the esters and other compounds prepared from this mixture of organic materials and which may be prepared by their interaction with acids or other compounds adapted to react therewith also have, due inter alia to more or less decomposition during esterification, an unpleasant odor and are usually more highly colored. The lower alkyl esters of the above polybasic acids, such, for example, as the dimethyl, dibutyl, diamyl esters of those acids and more particularly such esters as the dialkyl phthalates are likewise often highly colored as prepared.

Esters of a similar character are prepared by the esterification of octadecanediol (which may be synthesized in accord with the disclosure in the Lazier and Werntz copending application Ser. No. 619,734, filed June 28, 1932, which discloses a method of hydrogenating castor oil to octadecanediol) with the carboxylic acids giving, for example, diacetate, succinate, phthalate, diisobutyrate, hexahydrophthalate and adipate of octadecanediol. In most instances these products as well as the glycol diacylates, such as di-ethylene glycol diisobutyrate, di-ethylene glycol dipropionate and the higher esters of the glycols and glycerine are likewise discolored when prepared and because of this discoloration their utility is limited.

An object of the present invention is to provide a process for decolorizing and deodorizing by hydrogenation of oxygenated organic compounds containing two esterified groups. Another object of the invention is to provide a process for the hydrogenation of the products obtained by the interaction of the oxygenated organic compounds, obtained by the catalytic hydrogenation of carbon oxides under pressure, with other compounds adapted to react therewith. Yet another object of the invention is to provide a process for the purification by hydrogenation of the products obtained by the interaction of the oxygenated organic compounds, obtained by the catalytic hydrogenation of carbon oxides under pressure, and the dicarboxylic acids. A further object of the invention is to provide a process for the purification and deodorization of the compounds by catalytic hydrogenation under elevated temperature and pressure. Other objects and advantages will hereinafter appear.

I have found that the esters and other products obtained by the interaction of the oxygenated organic compounds, obtained by the catalytic hydrogenation of carbon oxides under pressure, with acids or other reactants adapted to react with them, can be rapidly and in a simple manner converted into substantially colorless and odorless products which do not discolor upon standing and which have only a slight and not particularly unpleasant odor. This conversion may be accomplished by hydrogenation in accord with my invention, and the product resulting therefrom consists substantially of a mixture of esters and other compounds which contain as a result of the hydrogenation substantially no unsaturated bodies.

The process is likewise applicable to other compounds containing a di-ester grouping such, for example as octadecanediol diacetate, octadecanediol adipate, octadecanediol phthalate, octadecanediol succinate, octadecanediol diisobutyrate, octadecanediol hexahydrophthalate, di-ethylene glycol diisobutyrate and di-ethylene glycol dipropionate, and the dialkyl dicarboxylic acid esters, such, for example, as the dimethyl, dipropyl, diisobutyl, and diamyl phthalate, oxalate, succinate, adipate and the other esters of the hereinbefore mentioned dicarboxylic acids.

The hydrogenation is carried out in substantially the following manner: to the mixture of compounds or ester there is added a suitable amount of a hydrogenating catalyst, such, for example, as a nickel catalyst, similar to that usually employed for hydrogenating processes, the resulting mixture is heated to a temperature within the range of approximately 100-150° C. and hydrogen is then forced into the liquid which has been disposed in a suitable pressure-sustaining vessel and the hydrogen circulated through the liquid which is maintained under pressure of from 200-3000 lbs. per sq in. or higher. The circulation of the hydrogen is continued until all or substantially all of the unsaturated bodies contained in the mixture of compounds have been substantially completely decolorized and deodorized; this usually requires from 4-20 hours according to the type of compound being hydrogenated, the temperature, and the activity of the catalyst used. If desired reducing gases other than hydrogen may be used, such, for example, as carbon monoxide, carbon monoxide and water, ammonia, etc.

The catalysts to be used in the hydrogenation are those usually employed for this purpose, such, for example, as nickel, cobalt, copper, platinum, alone or in mixtures, with or without a support or activating admixture, or both.

The invention will be described in greater detail in connection with the following specific examples according to which my invention may be carried out in practice, but the invention is not limited to the examples.

*Example I.*—250 grams of phthalates made, in accord with the process described in the Izard patent supra, i. e. by ester interchange between a low alkyl ester of phthalic acid and higher oxygenated organic compounds resulting from the methanol synthesis, and boiling from 133-150° C., were charged into a steel tube along with 13 grams of nickel on kieselguhr catalyst. The charge was subjected to 1200 pounds hydrogen pressure and the temperature raised to 120° C. Homogeneity of the reaction mass was maintained by shaking of the tube. Hydrogen absorption ceased after 3 hours time. The product was allowed to cool and filtered free of catalyst. It was found to be odorless and water-white whereas the material before hydrogenation had a sharp disagreeable odor and a deep yellow color.

*Example II.*—5260 parts by weight of phthalates made in accord with the process described in the Izard application supra, i. e. by ester interchange between a low alkyl ester of phthalic acid and higher oxygenated organic compounds resulting from the methanol synthesis, and boiling in the range 150-160° C. were charged into an autoclave along with 250 parts by weight of nickel on kieselguhr catalyst. This catalyst was similar to that described in Lazier application Ser. No. 620,296, and may be prepared by dissolving one mol. of nickel nitrate (290 grams) in the minimum quantity of water; 100 grams of kieselguhr is allowed to imbibe the nickel nitrate solution. The mixture is dried, if necessary, pulverized and allowed to fall gradually into a well stirred solution containing 1.5 mols of sodium carbonate in 10 liters of water maintained at a temperature of 70° C. The precipitate is well washed and dried, after which it is reduced with hydrogen 4 hours at a temperature of 400-450° C. The autoclave was subjected to 1500 pounds hydrogen pressure and the temperature was raised to 120-130° C. Agitation was provided by means of an internal high speed stirrer. Hydrogen absorption ceased after four hours reaction period. The product was cooled and filtered free of catalyst. The material taken for reaction and a brown color and a burnt odor. The product after hydrogenation was free of odor and almost water-white.

*Example III.*—500 parts of crude octadecanediol diacetate after filtration were charged into an autoclave with 50 parts of nickel on kieselguhr catalyst and subjected to 2700 pounds per sq. in. hydrogen pressure at a temperature from 150° C. After about two hours a practically odorless water-white ester was obtained.

*Example IV.*—The conditions of Example III were duplicated with di-ethylene glycol diisobutyrate as the charge and a product of excellent clarity was realized.

Catalysts other than those indicated above may be used in my process; for example, the oxides of the metals of Group VI-A of the periodic table which may be used in conjunction with the nickel, cobalt, and copper catalysts, resulting in such catalysts as nickel chromite, copper chromite, and the like.

Phthalic acid esters of various mixtures of the oxygenated organic compounds have been made. The mixtures of oxygenated organic compounds are obtained by fractionating the products obtained from the methanol synthesis to give, for example, several fractions having boiling ranges of 133-147; 147-157; 157-170; and 170 up; other fractions may, of course, be made. Phthalic acid esters made from the fraction boiling from 133-147° C. have a boiling range of 184-189° C., from the fraction boiling between 147-157° C. the phthalic ester boiling between 192-195° C., from the fraction 157-170 a phthalic ester boiling between 195-200° C., and from 170-190 an ester from 205-220° C. are obtained. A mixture of these esters boiling between approximately 184-220° C. may be obtained by esterifying a mixture of all fractions. The boiling points of the fractions are given at 760 mm. pressure, of the phthalic acid esters at approximately 5 mm. pressure.

From a consideration of the above specification it will be realized that any process for the purification by hydrogenation of the above designated compounds will come within the scope of my invention without sacrificing any of its advantages.

I claim:

1. In a process for the removal of color and odor from an oxygenated organic compound which contains at least two esterified groups, the steps which comprise intimately dispersing a hydrogenating catalyst into the ester and subsequently reducing it by the infusion of a reducing agent under elevated pressure and a temperature of 100-150° C.

2. In a hydrogenation process for the removal of color and odor from an oxygenated organic compound which contains at least two esterified groups, the steps which comprise intimately dispersing a hydrogenation catalyst into the ester and subsequently hydrogenating it by the infusion of hydrogen under elevated pressure and a temperature of from 100 to 150° C.

3. In a process for the removal of color and odor from an oxygenated organic compound which contains at least two esterified groups, the steps which comprise intimately dispersing from .05 to 5% of a hydrogenation catalyst into the ester, and subsequently hydrogenating it by the infusion of hydrogen under an elevated pressure and a temperature of 100–150° C.

4. In a process for the removal of color and odor from an oxygenated organic compound which contains at least two esterified groups, the steps which comprise intimately dispersing a nickel hydrogenation catalyst into the ester and subsequently hydrogenating it at a temperature of 100–150° C. and under a partial pressure of hydrogen of from 200–3000 lbs. per square inch, until the compound is decolorized and deodorized.

5. In a process for the removal of color and odor from an oxygenated organic compound which contains at least two esterified groups, the steps which comprise intimately dispersing approximately 1% of a nickel hydrogenation catalyst into the ester and subsequently hydrogenating it by the infusion of hydrogen at a temperature of from 100–150° C. and under a partial pressure of hydrogen of from 200–3000 lbs. per square inch.

6. In a hydrogenation process for the removal of color and odor from an oxygenated organic compound which contains at least two esterified groups, predominantly esters of the oxygenated organic compounds obtained from the catalytic hydrogenation of carbon oxides under elevated temperature and pressure, the steps which comprise intimately dispersing a hydrogenating catalyst into the esters and subsequently hydrogenating them by the infusion of hydrogen under elevated temperature and pressure.

7. In a hydrogenation process for the removal of color and odor from an oxygenated organic compound which contains at least two esterified groups, predominantly esters of the oxygenated organic compounds obtained from the catalytic hydrogenation of carbon oxides under elevated temperature and pressure, the steps which comprise intimately dispersing from .05 to 5% of a hydrogenation catalyst into the esters, and subsequently hydrogenating them by the infusion of hydrogen under an elevated temperature and pressure.

8. In a hydrogenation process for the removal of color and odor from an oxygenated organic compound which contains at least two esterified groups, predominantly esters of the oxygenated organic compounds obtained from the catalytic hydrogenation of carbon oxides under elevated temperatures and pressures, the steps which comprise intimately dispersing a nickel hydrogenation catalyst into the esters and subsequently hydrogenating them at a temperature of 100–150° C. and under a partial pressure of hydrogen of from 200–3000 lbs. per square inch, until the compounds are decolorized and deodorized.

9. In a hydrogenation process for the removal of color and odor from an oxygenated organic compound which contains at least two esterified groups, predominantly esters of the oxygenated organic compounds obtained from the catalytic hydrogenation of carbon oxides under elevated temperatures and pressures, the steps which comprise intimately dispersing a nickel hydrogenation catalyst into the mixture and subsequently hydrogenating and purifying it by the infusion of hydrogen under elevated temperature and pressure, the infusion being carried out under violent agitation and the pressure being maintained by forcing the hydrogen into the mixture under elevated pressure.

10. In a hydrogenation process for the removal of color and odor from an oxygenated organic compound which contains at least two esterified groups, predominantly esters of the oxygenated organic compounds obtained from the catalytic hydrogenation of carbon oxides under elevated temperatures and pressures, the steps which comprise intimately dispersing approximately 1% of a nickel hydrogenation catalyst into the ester and subsequently hydrogenating them by the infusion of hydrogen at a temperature of from 100–150° C., and under a partial pressure of hydrogen of from 200–3000 lbs. per square inch.

11. In a hydrogenation process for the removal of color and odor from an oxygenated organic compound which contains at least two esterified groups, predominantly polybasic acid esters of the oxygenated organic compounds obtained from the catalytic hydrogenation of carbon oxides under elevated temperatures and pressures, the steps which comprise intimately dispersing a hydrogenating catalyst into the mixture of esters and subsequently hydrogenating them by the infusion of hydrogen under elevated temperature and pressure.

12. In a hydrogenation process for the removal of color and odor from an oxygenated organic compound which contains at least two esterified groups, predominantly esters of the oxygenated organic compounds resulting from the ester interchange between the oxygenated organic compounds obtained from the catalytic hydrogenation of carbon oxides under elevated temperatures and pressures and an alkyl ester of a polybasic acid, the steps which comprise intimately dispersing a hydrogenating catalyst into the mixture of esters and subsequently hydrogenating them by the infusion of hydrogen under elevated temperature and pressure.

13. In a hydrogenation process for the removal of color and odor from the phthalic acid esters of the oxygenated organic compounds obtained from the catalytic hydrogenation of carbon oxides under elevated temperatures and pressures, the steps which comprise intimately dispersing the hydrogenating catalyst into the esters and subsequently hydrogenating them by the infusion of hydrogen under elevated temperature and pressure.

14. In a hydrogenation process for the removal of color and odor from octadecanediol diacetate, the steps which comprise intimately dispersing approximately 1% of a nickel hydrogenation catalyst into the ester and subsequently hydrogenating it by the infusion of hydrogen at a temperature of from 100–150° C., and under a partial pressure of hydrogen of from 200–3000 lbs. per square inch.

15. In a hydrogenation process for the removal of color and odor from di-ethylene glycol di-isobutyrate, the steps which comprise intimately dispersing approximately 1% of a nickel hydrogenation catalyst into the ester and subsequently hydrogenating it by the infusion of hydrogen at a temperature of from 100–150° C., and under a partial pressure of hydrogen of from 200–3000 lbs. per square inch.

16. A new composition of matter,—a water-white mixture of saturated compounds, predominantly esters of the oxygenated organic compounds obtained from the catalytic synthesis of methanol from carbon monoxide and hydrogen conducted under elevated temperatures and pressures, which compounds prior to esterification boiled above methanol.

17. A new composition of matter,—a water-white mixture of saturated compounds, predominantly esters of the oxygenated organic compounds obtained from the catalytic synthesis of methanol from carbon monoxide and hydrogen conducted under elevated temperatures and pressures, which compound prior to esterification had a boiling range of from approximately 184° C., to 220° C.

18. A new composition of matter comprising a water-white mixture of saturated compounds, predominantly polybasic acid esters of the oxygenated organic compounds, obtained from the catalytic synthesis of methanol from carbon monoxide and hydrogen conducted under elevated pressures and temperatures.

19. A new composition of matter,—water-white octadecanediol diacetate.

JOHN C. WOODHOUSE.